United States Patent

Kretschmer et al.

(10) Patent No.: US 9,558,568 B2
(45) Date of Patent: Jan. 31, 2017

(54) VISUALIZATION METHOD FOR A HUMAN SKELETON FROM A MEDICAL SCAN

(71) Applicant: Siemens Healthcare GmbH, Erlangen (DE)

(72) Inventors: Jan Kretschmer, Nürnberg (DE); Nathan Lay, Plainsboro, NJ (US); Shaohua Kevin Zhou, Plainsboro, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 14/706,160

(22) Filed: May 7, 2015

(65) Prior Publication Data

US 2015/0379744 A1  Dec. 31, 2015

Related U.S. Application Data

(60) Provisional application No. 62/018,083, filed on Jun. 27, 2014.

(51) Int. Cl.
| | |
|---|---|
| G06K 9/00 | (2006.01) |
| G06T 11/00 | (2006.01) |
| G06T 7/00 | (2006.01) |
| G06T 19/20 | (2011.01) |

(52) U.S. Cl.
CPC ........... *G06T 11/003* (2013.01); *G06T 7/0012* (2013.01); *G06T 19/20* (2013.01); *G06T 2210/41* (2013.01); *G06T 2210/44* (2013.01); *G06T 2219/021* (2013.01); *G06T 2219/2016* (2013.01)

(58) Field of Classification Search
CPC ...... G06T 11/003; G06T 19/20; G06T 7/0012; G06T 2207/10081; G06T 2207/30008; G06T 2210/41; G06T 2210/44; G06T 2211/40; G06T 2219/021; G06T 2219/2016

See application file for complete search history.

(56) References Cited

U.S. PATENT DOCUMENTS

| | | | |
|---|---|---|---|
| 7,046,830 B2 | 5/2006 | Gerard et al. | |
| 7,336,809 B2 | 2/2008 | Zeng et al. | |
| 7,627,159 B2 | 12/2009 | Kiraly et al. | |
| 7,813,535 B2 | 10/2010 | Florin et al. | |
| 7,873,195 B2 | 1/2011 | Makram-Ebeid | |
| 8,073,220 B2 | 12/2011 | Khamene et al. | |
| 8,300,047 B2 | 10/2012 | Sudarsky et al. | |
| 8,311,301 B2 | 11/2012 | Gindele | |

(Continued)

FOREIGN PATENT DOCUMENTS

WO   2006050102   5/2006

OTHER PUBLICATIONS

Silver et al ("reshaping Medical Volumetric Data for Enhanced Visualization", Medicine meets virtual reality conference, pp. 488-492, 2002).*

(Continued)

*Primary Examiner* — Amara Abdi

(57) ABSTRACT

A visualization method is provided that allows for the unfolding of a human skeleton from a medical image scan and providing increased efficiency for interacting with the image scan and whole body bone reading from such scans. That is, a full head-to-toe unfolded skeleton view (e.g., a 2D unfolded view) is realized for improved visualization and diagnostic capabilities.

20 Claims, 6 Drawing Sheets

(56) References Cited

U.S. PATENT DOCUMENTS

| | | | |
|---|---|---|---|
| 8,571,285 | B2 | 10/2013 | Ramakrishnan et al. |
| 8,705,830 | B2 | 4/2014 | Ringl |
| 8,837,771 | B2 | 9/2014 | Lay et al. |
| 2007/0249910 | A1* | 10/2007 | Kiraly .............. G06T 7/60 600/300 |
| 2008/0049991 | A1* | 2/2008 | Gering .............. G06T 19/00 382/128 |
| 2008/0287796 | A1 | 11/2008 | Kiraly et al. |
| 2009/0063119 | A1* | 3/2009 | Chiang ............. G09B 23/36 703/11 |
| 2010/0208048 | A1* | 8/2010 | Cha ............... G06F 19/3406 348/77 |
| 2011/0103654 | A1 | 5/2011 | Lavoie et al. |
| 2011/0255763 | A1 | 10/2011 | Bogoni et al. |
| 2013/0070996 | A1 | 3/2013 | Liu et al. |
| 2013/0077841 | A1 | 3/2013 | Wu et al. |
| 2013/0101197 | A1* | 4/2013 | Kaftan ............. G06T 5/00 382/131 |
| 2013/0121549 | A1 | 5/2013 | Pekar et al. |
| 2014/0093153 | A1 | 4/2014 | Sofka et al. |

OTHER PUBLICATIONS

Kiraly et al., A novel visualization method for the ribs within chest volume data, Proceedings of SPIE, 6141:1-8 (2006).

Silver et al, Reshaping Medical Volumetric Data for Enhanced Visualization, Medicine Meets Virtual Reality conference, 2(10): 488-492, (2002).

U.S. Appl. No. 14/077,293, filed Nov. 12, 2013.

U.S. Appl. No. 14/077,289, filed Nov. 12, 2013.

Bookstein, "Principal Warps: Thin-Plate Splines and the Decomposition of Deformtations," IEEE Transactions on Pattern Analysis and Machine Intelligence, vol. 11, No. 6, Jun. 1989, pp. 567-585.

Rohr et al., "Landmark-Based Elastic Registration using Approximating Thin-Plate Splines," IEEE Transactions on Medical Imaging, vol. 20, No. 6, Jun. 2001, pp. 526-534.

Kretschmer et al., "ADR—Anatomy-Driven Reformation," IEEE Transactions on Visualization and Computer Graphics, vol. 20, No. 12, Dec. 2014, pp. 2496-2505.

Zollhöfer et al., "GPU based ARAP Deformation using Volumetric Lattics," Eurographics 2012, European Association for Computer Graphics.

H. Ringl et al, The Skull Unfolded: A Cranial CT Visualization Algorithm for Fast and Easy Detection of Skull Fractures, Radiology, 255 (2): 553-562, (2010).

Singh V. et al., Interactive Volume Manipulation with Selective Rendering for Improved Visualization, Volume Visualization and Graphics, pp. 95-102, (2004).

* cited by examiner

VISUALIZATION METHOD FOR A HUMAN SKELETON FROM A MEDICAL SCAN

This application claims the benefit of U.S. Provisional Application No. 62/018,083, filed Jun. 27, 2014, the disclosure of which is herein incorporated by reference.

TECHNICAL FIELD

The present invention relates generally to medical imaging, and, more particularly, to visualizing, unfolding and analyzing a human skeleton from a medical scan.

BACKGROUND OF THE INVENTION

State of the art whole body image scanning systems are often utilized in diagnosing a variety of medical ailments from medical scans such as computed tomography (CT), magnetic resonance (MR), positron emission tomography-computed tomography (PET/CT), single photon emission-computed tomography (SPECT/CT), and PET/MRI, to name just few. Many times patient bone assessment is required during diagnostic evaluation from such medical scans which can be a time consuming task given that current clinical practices require the reading of multiplanar rendering (MPR) planes in a sequential fashion.

Further, bone assessment from such medical scans can be error prone due to the inherent complexity of human bone shapes and the associated twisted geometry, and that bone intensity (including marrow) varies across individual patients having different bone anomalies (e.g., cancer metastasis, simple fractures, and complex fractures from acute/trauma). This complexity is exacerbated when functional imaging modality (e.g., PET/CT or SPECT/CT or PET/MRI) is utilized for acquiring whole body scans in an effort to discover so-called "hot spots" located throughout the human body.

In addition to the complexity introduced by the nature of human bones and associated skeleton structure, it can also be non-intuitive for the user (e.g., medical technician or medical doctor) to interact with the medical scan from the aforementioned systems. Further, difficulties may arise in navigating the medical image volume itself, marking findings from the image scan and/or drawing bone centerlines. For example, the medical scan generated may be a 3D CT volume which provides a large amount of data that is difficult and tedious for such medical professionals to visualize, examine in an efficient manner, and perform various diagnostic operations.

Existing techniques directed to improving the visualization of ribs in, for example, CT volumes in 3D medical image volumes and to unfold the rib cage into a 2D image are described in U.S. Patent Application Publication No. 2013/0070996, "Method and System for Up-Vector Detection for Ribs in Computed Tomography Volumes", D. Liu et al., published on Mar. 21, 2013 (hereinafter "Liu"), and U.S. Pat. No. 7,627,159, "2D Visualization for Rib Analysis", A. Kiraly et al., issued on Dec. 1, 2009 (hereinafter "Kiraly"), each of which is hereby incorporated by reference for all purposes. These techniques allow for the unfolding of the 3D rib cage image into a 2D image to improve examination time and reduce ambiguity in interpreting the CT data of the ribs.

A need exists for an improved technique of unfolding and visualizing the full human skeleton from a medical scan and interacting with the image scan for full body bone reading.

BRIEF SUMMARY OF THE EMBODIMENTS

In accordance with various embodiments, a visualization method is provided that allows for the unfolding of a human skeleton from a medical image scan and providing increased efficiency for interacting with the image scan and whole body bone reading from such scans. That is, in accordance with various embodiments, a full head-to-toe unfolded skeleton view (e.g., a 2D unfolded view) is realized for improved visualization and diagnostic capabilities.

In accordance with an embodiment, given a 3D medical scan, automatic image segmentation is utilized to segment an image volume of the human skeleton (having a plurality of bones) from the medical scan into a 3D mesh or binary mask corresponding to the entire skeleton that is specific to the medical scan (i.e., the skeleton specific to the patient being diagnosed). The image volume could be of the entire skeleton itself or individual image volumes of each bone of the plurality of bones that define the skeleton. Alternatively, the image segmentation could produce a plurality of 3D meshes with one mask per different bone of the skeleton or a multi-label mask with each label corresponding to a different bone.

After segmenting the skeleton from the medical scan, in accordance with an embodiment, bone unfolding is accomplished using one or more patient-specific warping functions. In particular, the segmented skeleton is divided into various groups consisting of different portions of the skeleton. Illustratively, a first group is defined to include the spine, ribs and pelvis, a second group for the left arm and hand, a third group for the right arm and hand, a fourth group for the left leg and left foot, a fifth group for the right leg and right foot, and a sixth group for the head/skull. For each identified group, a warping function is applied to unfold and straighten the individual bones and respective skeleton features.

For example, a warping function is computed that will straighten the spine, flatten the ribs and flatten the pelvis. Further, a separate warping function will be computed for each upper and lower extremity (e.g., defined by the second, third, fourth and fifth groups identified above) which will fit the respective bones of a select extremity into one image plane. As such, in accordance with the embodiment, a 2D planar view is generated of the entire unfolded bone structure of the skeleton being examined. In accordance with a further embodiment, a 3D rendering view is also generated of the entire skeleton body structure of the patient.

Advantageously, in accordance with various embodiments, the generated unfolded views of the individual bones and associated full skeleton body can be used to more efficiently visualize the images, analyze the patient (and subject medical scan thereof) and diagnosis medical conditions. For example, in accordance with an embodiment, the user can interact with the unfolded skeletal images by rotating individual bones in the unfolded views or selecting a particular bone to view and the image system will immediately move the corresponding location(s) in the corresponding 3D image view that may be displayed to the user. The user may also move various portions of the skeletal image to simulate articulated motions of an extremity, for example, to assist in the overall diagnosis.

These and other advantages of the embodiments will be apparent to those of ordinary skill in the art by reference to the following detailed description and the accompanying drawings.

DETAILED DESCRIPTION

Figure 1:
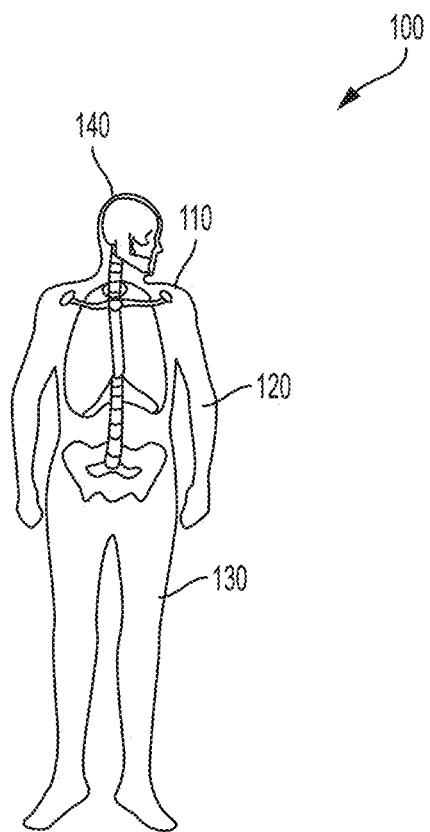
FIG. 1 shows an illustrative full body CT medical scan.

FIG. 1 shows an illustrative full body CT medical scan 100 of a human that can be generated using any number of well-known medical imaging systems utilized in diagnosing a variety of medical ailments from medical scans such as CT, MR, PET/CT, SPECT/CT and PET/MRI, to name just few. As will be appreciated, medical scan 100 is generated and utilized for examination of medical conditions of a human patient, for example, in regions such as the shoulder 110, upper extremity 120, lower extremity 130 or head 140, to name just a few. However, examination of medical scan 100 itself can be time consuming, inefficient and error prone.

In accordance with various embodiments, a visualization method is provided that allows for the unfolding of a human skeleton from a 3D medical image scan and providing increased efficiency for interacting with the image scan and whole body bone reading from such scans. That is, in accordance with various embodiments, a full head-to-toe unfolded skeleton view (e.g., a 2D unfolded view) is realized for improved visualization and diagnostic capabilities.

Figure 2:
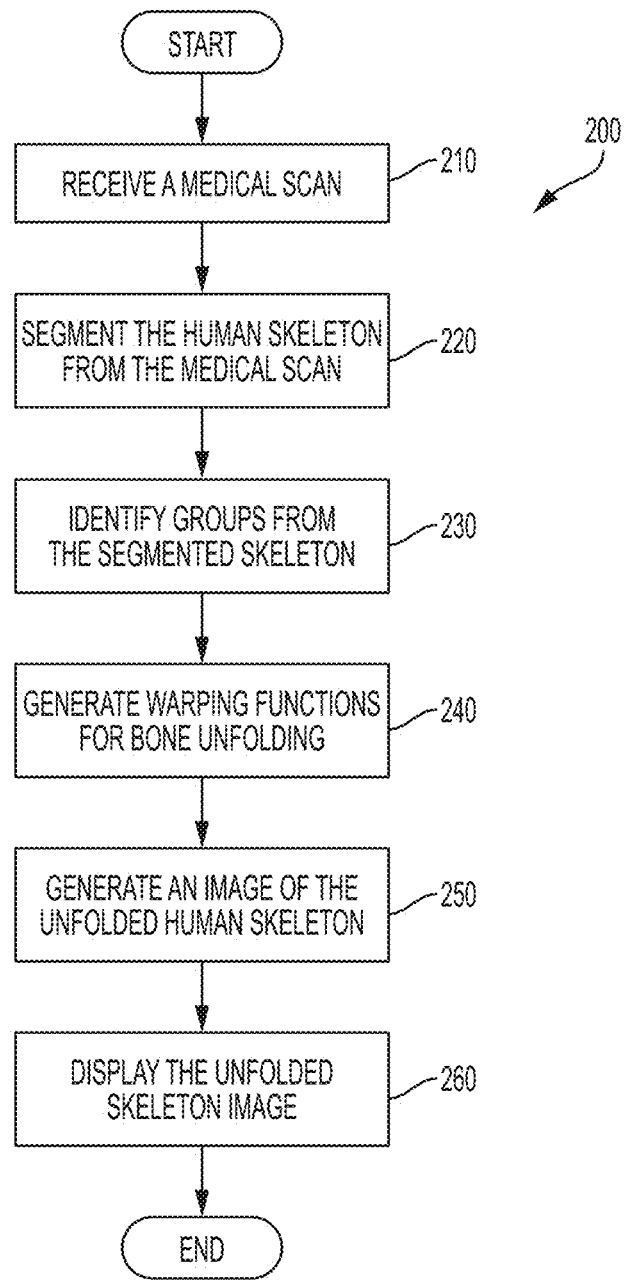
FIG. 2 shows a flowchart of illustrative operations for unfolding and visualizing a human skeleton in accordance with an embodiment.

More particularly, FIG. 2 shows a flowchart of illustrative operations 200 for unfolding and visualizing a human skeleton in accordance with an embodiment. In accordance with the embodiment, at step 210, a 3D medical scan is received, for example, medical scan 100 as shown in FIG. 1. For example, the 3D medical scan may be received directly from a scanner used to acquire such a medical scan or may be received by loading a previously stored 3D medical scan (e.g., from a memory or other storage device). At step 220, the human skeleton is segmented from the 3D medical scan. Illustratively, in accordance with an embodiment, automatic image segmentation is utilized to segment the human skeleton from the medical scan into a 3D mesh or binary mask corresponding to the entire skeleton that is specific to the medical scan (i.e., the skeleton specific to the patient being diagnosed). Alternatively, the image segmentation could produce a plurality of 3D meshes with one mask per different bone of the skeleton or a multi-label mask with each label corresponding to a different bone. Examples of such image segmentation techniques are as described in U.S. Patent Application Publication No. 2013/0077841, "Method and System for Automatic Rib Centerline Extraction Using Learning Base Deformable Template Matching", D. Wu et al., published on Mar. 28, 2013 (hereinafter "Wu") which describes a method for rib extraction, and U.S. Patent Application Publication No. 2014/0093153, "Method and System for Bone Segmentation for Joint Replacement Surgery", M. Sofka et al. published on Apr. 3, 2014 (hereinafter "Sofka") which describes a method for segmenting multiple knee bones, each of which is incorporated by reference herein for all purposes.

After segmenting the skeleton from the medical scan, in accordance with an embodiment, bone unfolding is accomplished using one or more patient-specific warping functions. In particular, at step 230, various groups are identified consisting of different portions of the skeleton. As will be appreciated, the human skeleton is comprised of a plurality of bones which may need to be visualized in order to provide an appropriate and accurate medical diagnosis. As such, the segmented skeleton is divided into groups of skeletal sections. Illustratively, a first group is defined to correspond with the spine, ribs and pelvis, a second group for the left arm and hand, a third group for the right arm and hand, a fourth group for the left leg and left foot, a fifth group for the right leg and right foot, and a sixth group for the head/skull. For each identified group, at step 240, a warping function is generated to unfold and straighten the individual bones and respective skeleton features. For example, a warping function is computed that will straighten the spine, flatten the ribs and flatten the pelvis. Further, a separate warping function will be computed for each upper and lower extremity (e.g., defined by the second, third, fourth and fifth groups identified above) which will fit all the bones of a respective extremity into a planar setting that exposes a significantly improved alignment of the structure with a plane. As such, at step 250, an image of the unfolded human skeleton is generated and, at step 260, the unfolded skeleton image is displayed to a user (e.g., medical technician or medical doctor) for visualization and diagnostic purposes.

Warping functions do not necessarily have to be grouped by anatomical components. This means that multiple (preferably, but not necessarily attached) anatomical structures can be unfolded with one combined warping function. For example, the spine and the pelvic bone or a hand and the corresponding arm can be mapped with one comprehensive warp to preserve their spatial relationship, or to visualize joints. The general problem of finding low-distortion mappings between objects of different shape is a classical problem in computer graphics and well understood. For example, it appears (amongst other fields) in texture mapping, ambient space warping, surface-based mesh deformation and volumetric mesh deformation.

The general form of a 3D warping function W(x): R^3->R^3 maps every point in space to a different location. Common choices to define such mappings are based on smooth interpolations of sparse landmark offsets by making use of so-called radial basis functions (RBFs), for example, thin plate spline RBFs as described in F. L. Bookstein, "*Principle Warps: Thin-Plate Splines and the Decomposition of Deformations*", IEEE Transactions on Pattern Analysis and Machine Intelligence, pp. 567-585, Vol. 11, No. 6, June 1980, and K. Rohr et al., "*Landmark-Based Elastic Registration Using Approximating Thin-Plate Splines*", IEEE Transactions on Medical Imaging, pp. 526-534, Vol. 20, No. 6, June 2001, each of which is hereby incorporated by reference for all purposes. Further, a different class of approaches is based on a discretization of space into small cells that are consistently mapped to a deformed setting, for example, as described in M. Zollhofer et al, "*GPU based ARAP Deformation using Volumetric Lattices*", Eurographics 2012/C. Andujar, E. Puppo, The Eurographics Association 2012, which is hereby incorporated by reference for all purposes, or methods that parameterize the surrounding of a planar mesh as described in J. Kretschmer et al., "*ADR—Anatomy-Driven Reformation*", pp. 2496-2505, IEEE Transactions on Visualization and Computer Graphics, Vol. 20, No. 12, December 2014, which is hereby incorporated by reference for all purposes.

In general the warping function W(x) itself is an interchangeable component. Preferable properties of the component include smoothness (i.e., the mapping should not fold), the preservation of angles (i.e., conformality) and the preservation of distances (i.e., rigidity) and usually different trade-offs between the two have to be made. Further, the warping function W(x) might be defined in a volumetric manner (e.g., defining a warp for a certain surrounding of the unfolded surface) or for the unfolding surface only (e.g., flattening a surface only).

Figure 3:
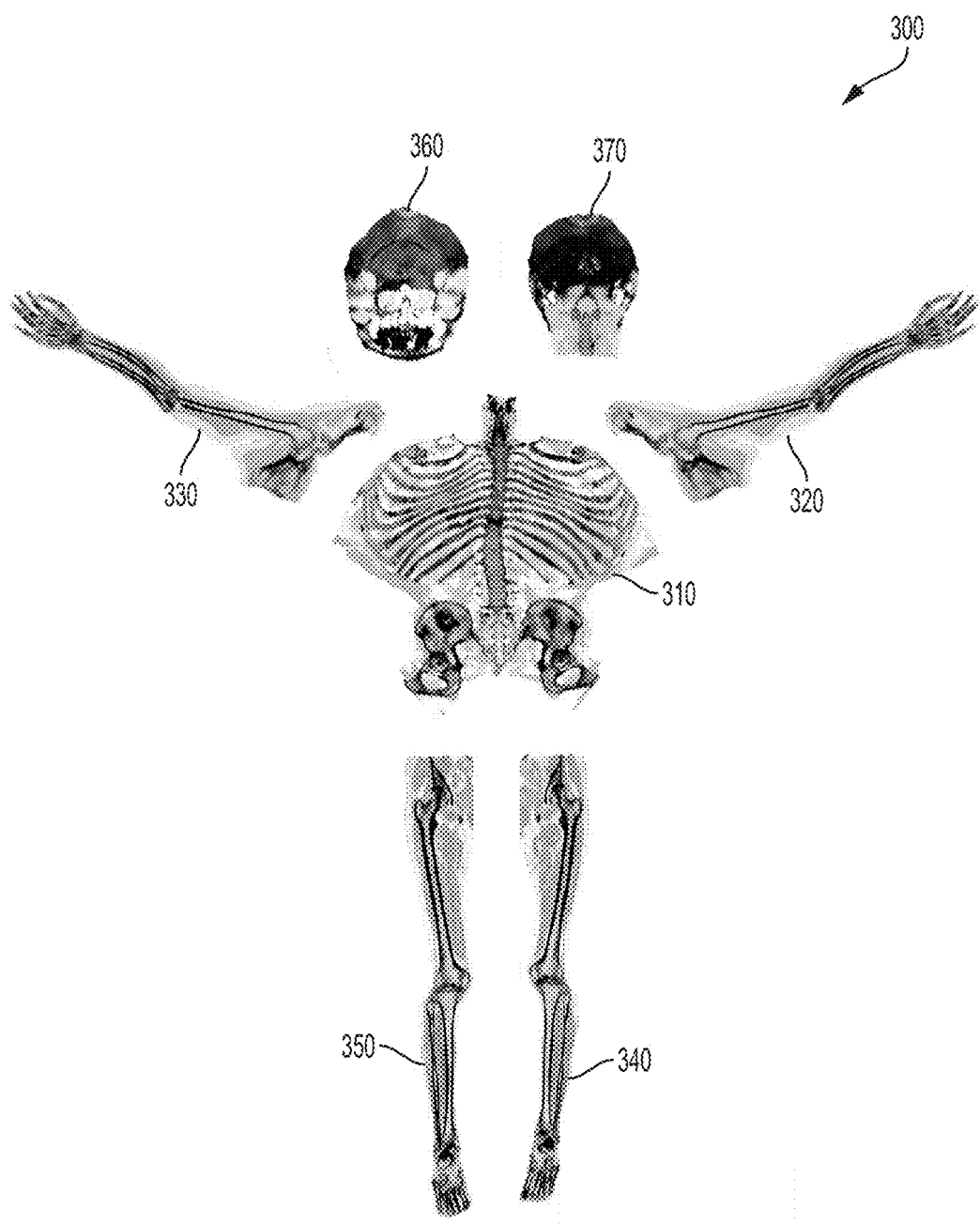
FIG. 3 shows an illustrative 2D planar image of unfolding and visualizing a human skeleton from a medical scan in accordance with an embodiment.

Advantageously, in accordance with various embodiments, the generated unfolded views of the full skeleton body can be used to visualize the image and more efficiently analyze the patient (and subject medical scan thereof) and diagnosis medical conditions. For example, FIG. 3 shows an illustrative 2D planar image 300 of the unfolding of a human skeleton from a medical scan in accordance with an embodiment as detailed herein above. As shown in FIG. 3, various image portions show the unfolding of the individual bones from the segmented image as described above. For example, view 310 shows the first group defined to include the spine, ribs and pelvis, view 320 shows the second group for the left arm and hand, view 330 shows the third group for the right arm and hand, view 340 shows the fourth group for the left leg and left foot, view 350 shows the fifth group for the right leg and right foot, and view 360 and view 370 show, respectively, the sixth group for the head/skull.

Figure 4:
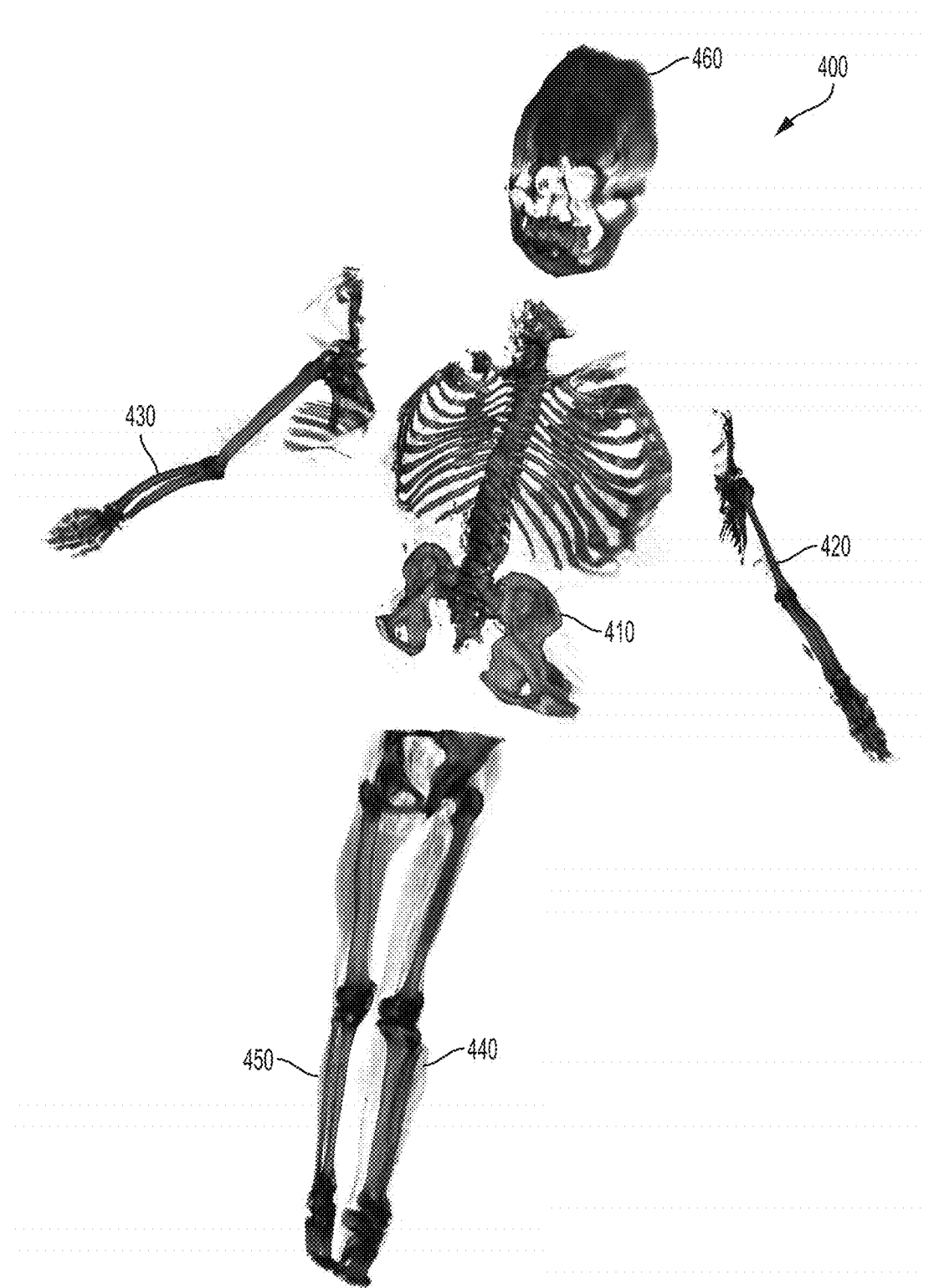
FIG. 4 shows an illustrative 3D rending view of the unfolded human skeleton depicted in FIG. 3 in accordance with an embodiment.

In addition to 2D views, in accordance with a further embodiment, FIG. 4 shows an illustrative 3D rending view 400 of the unfolded human skeleton depicted in FIG. 3 to allow for further visualization and diagnostic capabilities. As shown in FIG. 4, various image portions show the unfolding of the individual bones from the segmented image as described above. For example, view 410 shows the first group defined to include the spine, ribs and pelvis, view 420 shows the second group for the left arm and hand, view 430 shows the third group for the right arm and hand, view 440 shows the fourth group for the left leg and left foot, view 450 shows the fifth group for the right leg and right foot, and view 460 shows the sixth group for the head/skull.

Figure 5:
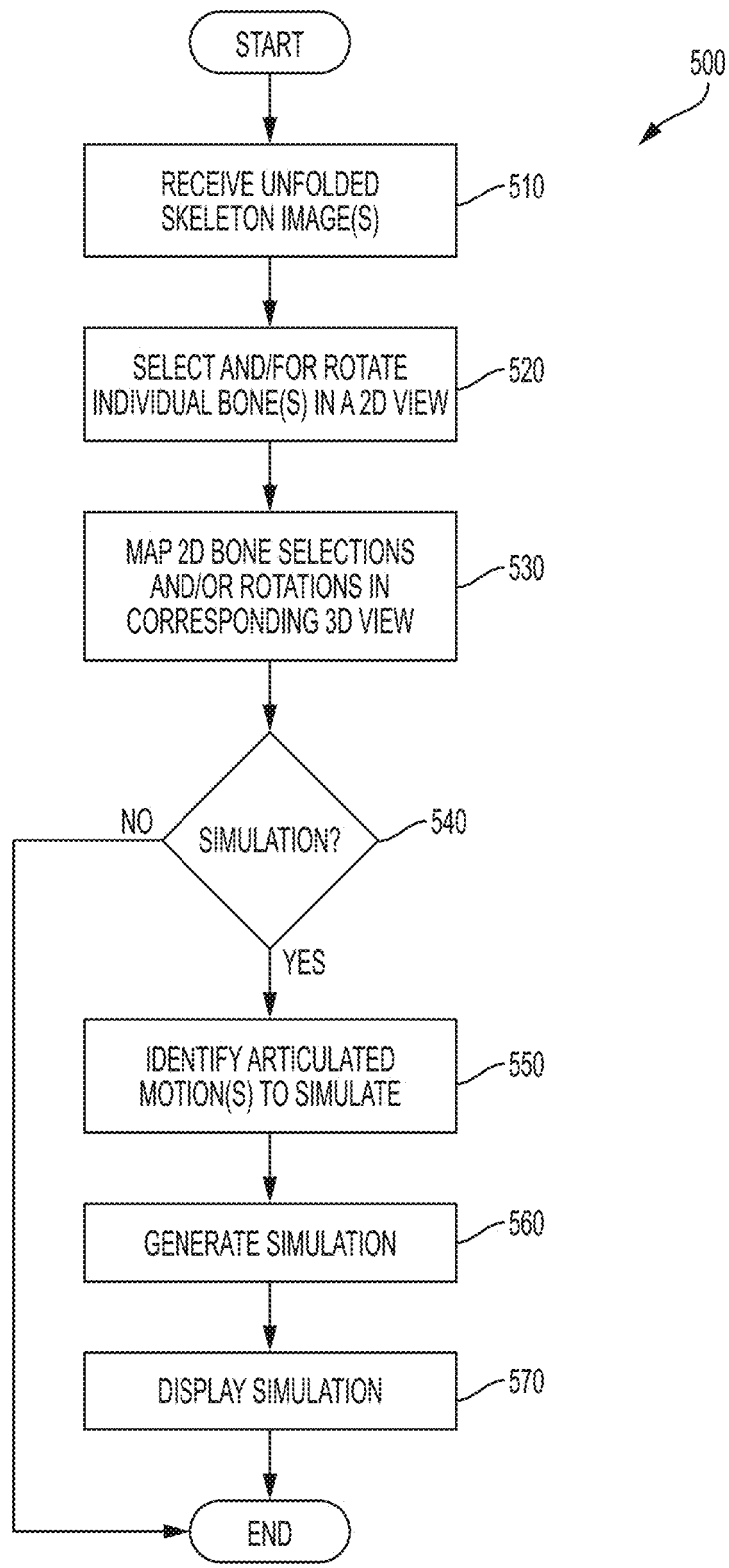
FIG. 5 shows a flowchart of illustrative operations for visualizing, interacting and manipulating unfolded skeleton views, for example, the view shown in FIG. 3, in accordance with an embodiment.

As noted previously, in accordance with various embodiments, the generated unfolded views of the full skeleton body can be used to more efficiently visualize the image and analyze the patient (and subject medical scan thereof) and diagnosis medical conditions. FIG. 5 shows a flowchart of illustrative operations 500 for visualizing, interacting and manipulating unfolded skeleton views, for example, the view shown in FIG. 3, in accordance with an embodiment. At step 510, in accordance with an embodiment, the unfolded skeleton image(s) are received, such unfolded skeleton image(s) are generated as detailed above. As such, at step 520, the user can interact with the unfolded skeletal images by rotating individual bones in the unfolded views or selecting a particular bone to view and the image system will immediately map, at step 530, the corresponding location(s) in the corresponding 3D image view. The user may also move various portions of the skeletal image to simulate articulated motions of an extremity, for example, to assist in the overall diagnosis. As such, at step 540 if a simulation is desired, the articulated motion(s) to simulate are identified, at step 550, from direct input received from the user, and the simulation is generated, at step 560, and displayed at step 570 for further diagnostic evaluation.

The above-described methods are described using computed tomography (CT) as the imaging modality, but the various embodiments are not limited thereto. The above-described methods may be similarly applied on other imaging modalities, such as MR, PET/CT, SPECT/CT, PET/MRI, x-ray, and ultrasound, to name just a few.

Figure 6:
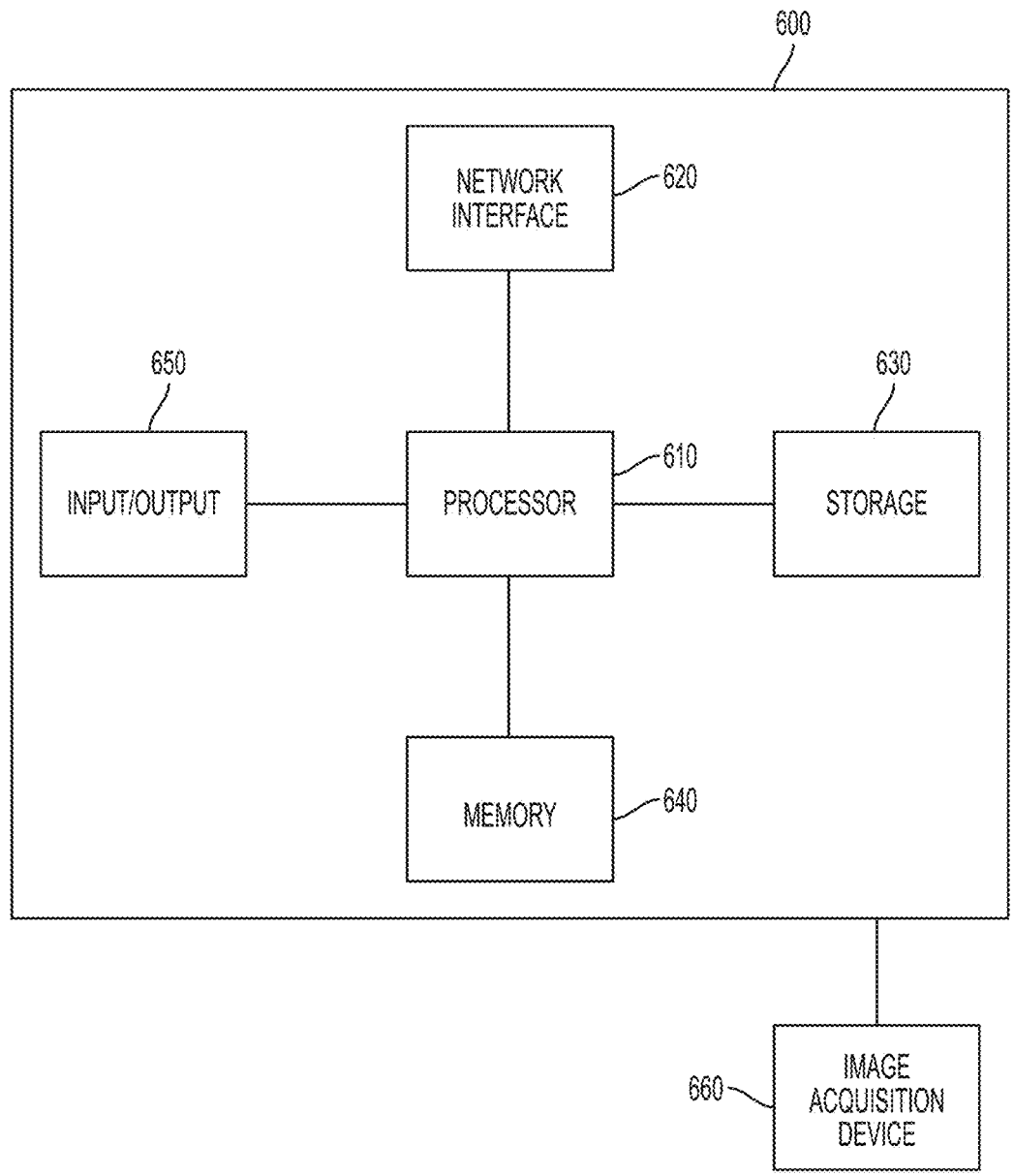
FIG. 6 is a high-level block diagram of an exemplary computer capable of implementing various embodiments herein.

The above-described methods for unfolding an entire skeleton from 3D volume to a 2D image and visualizing, evaluating and manipulating the unfolded skeleton images may be implemented on a computer using well-known computer processors, memory units, storage devices, computer software, and other components. A high level block diagram of such a computer is illustrated in FIG. 6. Computer 600 contains a processor 610 which controls the overall operation of the computer 600 by executing computer program instructions which define such operation. The computer program instructions may be stored in a storage device 630, or other computer readable medium (e.g., magnetic disk, CD ROM, etc.) and loaded into memory 640 when execution of the computer program instructions is desired. Thus, the steps of the methods of FIGS. 2 and 5, respectively, may be defined by the computer program instructions stored in the memory 640 and/or storage 630 and controlled by the processor 610 executing the computer program instructions. An image acquisition device 660, such as a CT scanner, can be connected to the computer 600 to input images to the computer 600. It is possible to implement the image acquisition device 660 and the computer 600 as one device. It is also possible that the image acquisition device 660 and the computer 600 communicate wirelessly through a network in a well-known fashion.

In a possible embodiment, computer 600 may be located remotely with respect to the image acquisition device 660 and may perform the method steps of FIG. 2 and/or FIG. 5 as part of a server or cloud-based service (or architecture). The computer 600 also includes one or more network interfaces 620 for communicating with other devices via a network. The computer 600 also includes other input/output devices 650 that enable user interaction with the computer 600 (e.g., display, keyboard, mouse, speakers, buttons, etc.). One skilled in the art will recognize that an implementation of an actual computer could contain other components as well, and that FIG. 6 is a high level representation of some of the components of such a computer for illustrative purposes.

It should be noted that for clarity of explanation, the illustrative embodiments described herein may be presented as comprising individual functional blocks or combinations of functional blocks. The functions these blocks represent may be provided through the use of either dedicated or shared hardware, including, but not limited to, hardware capable of executing software. Illustrative embodiments may comprise digital signal processor ("DSP") hardware and/or software performing the operation described herein. Thus, for example, it will be appreciated by those skilled in the art that the block diagrams herein represent conceptual views of illustrative functions, operations and/or circuitry of the principles described in the various embodiments herein. Similarly, it will be appreciated that any flowcharts, flow diagrams, state transition diagrams, pseudo code, program code and the like represent various processes which may be substantially represented in computer readable medium and so executed by a computer, machine or processor, whether or not such computer, machine or processor is explicitly shown. One skilled in the art will recognize that an implementation of an actual computer or computer system may have other structures and may contain other components as well, and that a high level representation of some of the components of such a computer is for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for visualizing a skeleton having a plurality of bones, the method comprising:
   segmenting, from a three-dimensional (3D) image scan of a body including the skeleton, an image volume for the skeleton;
   straightening each bone of the plurality of bones based on a corresponding segmented image volume of the skeleton; and
   generating a two-dimensional (2D) image based on the straightened corresponding segmented image volume of each bone of the plurality of bones, the 2D image being a 2D unfolded view of a full head-to-toe unfolded skeleton view of the body.

2. The method of claim 1 further comprising:
   displaying the generated 2D image.

3. The method of claim 1, wherein the straightening each bone of the plurality of bones step, further comprises:
   identifying a plurality of image groups from the segmented image volume of the skeleton, each image group of the plurality of image groups corresponding with one or more portions of the skeleton; and
   calculating a warping function for each image group of the plurality of image groups.

4. The method of claim 3 wherein a first image group of the plurality of image groups includes a spine, rib cage and pelvis, and a second image group of the plurality of image groups includes at least one arm.

5. The method of claim 4 further comprising:
   identifying, using the 2D image, at least one articulated motion involving particular bones of the plurality of bones; and
   simulating the at least one articulated motion.

6. The method of claim 5 further comprising:
   displaying the simulated at least one articulated motion.

7. The method of claim 2 wherein the 3D image scan comprises a computed tomography (CT) image of the body.

8. The method of claim 5, wherein the segmenting the image volume of the skeleton step further comprises:
   ordering and labeling each bone of the plurality of bones.

9. A method for visualizing a skeleton having a plurality of bones, the method comprising:
   segmenting, from a three-dimensional (3D) image scan of a body including the skeleton, an image volume for each bone of the plurality of bones of the skeleton;
   straightening each bone of the plurality of bones based on its respective segmented image volume; and
   generating a two-dimensional (2D) image based on the respective straightened segmented image volume of each bone of the plurality of bones, the 2D image being a 2D unfolded view of a full head-to-toe unfolded skeleton view of the body.

10. The method of claim 9 further comprising:
    displaying the generated 2D image.

11. The method of claim 9, wherein the straightening each bone of the plurality of bones step further comprises:
    identifying a plurality of image groups from the respective segmented image volume of each bone of the plurality of bones, each image group of the plurality of image groups corresponding with one or more portions of the skeleton; and
    calculating a warping function for each image group of the plurality of image groups.

12. The method of claim 11 wherein a first image group of the plurality of image groups includes at least one leg, and a second image group of the plurality of image groups includes a head.

13. The method of claim 9 wherein the 3D image scan comprises a magnetic resonance (MR) image of the body.

14. The method of claim 9 wherein the 3D image scan comprises a positron emission tomography-computed tomography (PET/CT) image of the body.

15. The method of claim 11 wherein the warping function for each image group preserves a spatial relationship between the one or more portions of the skeleton corresponding to such image group.

16. The method of claim 9 further comprising:
    identifying, using the 2D image, at least one articulated motion involving particular bones of the plurality of bones; and
    simulating the at least one articulated motion.

17. The method of claim 16 further comprising:
    displaying the simulated at least one articulated motion; and
    modifying the 2D image based on an input defined from the displaying of the simulated at least one articulated motion.

18. A non-transitory computer-readable medium storing computer program instructions for executing a method of visualization, the computer program instructions, when executed on a processor, cause the processor to perform operations comprising:
    segmenting, from a three-dimensional (3D) image scan of a body including a skeleton having a plurality of bones, an image volume for the skeleton;
    straightening each bone of the plurality of bones based on a corresponding segmented image volume of the skeleton; and
    generating a two-dimensional (2D) image based on the corresponding straightened segmented image volume of each bone of the plurality of bones, the 2D image being a 2D unfolded view of a full head-to-toe unfolded skeleton view of the body.

19. The non-transitory computer-readable medium of claim 18 wherein the operations further comprise:
    identifying a plurality of image groups from the segmented image volume of the skeleton, each image group of the plurality of image groups corresponding with one or more portions of the skeleton; and
    calculating a warping function for each image group of the plurality of image groups.

20. The non-transitory computer-readable medium of claim 19 wherein the 3D image scan comprises a computed tomography (CT) image of the body, and the operations further comprising:

displaying a simulation of at least one articulated motion involving particular ones of the plurality of bones; and
modifying the 2D image based on an input defined from the displaying of the simulated at least one articulated motion.

* * * * *